(12) United States Patent
Moriya et al.

(10) Patent No.: US 8,687,929 B2
(45) Date of Patent: Apr. 1, 2014

(54) OPTICAL COLLIMATOR, OPTICAL CONNECTOR USING SAME AND HOLDING MEMBER FOR OPTICAL COLLIMATOR

(75) Inventors: Naohiko Moriya, Yokohama (JP); Yojiro Sano, Yokohama (JP); Hitoshi Suzuki, Yokohama (JP); Kiyoshi Iwamoto, Yokohama (JP)

(73) Assignee: Mitsubishi Pencil Company Limited, Tokyo (JP)

( * ) Notice: Subject to any disclaimer, the term of this patent is extended or adjusted under 35 U.S.C. 154(b) by 0 days.

(21) Appl. No.: 13/641,306

(22) PCT Filed: Apr. 5, 2011

(86) PCT No.: PCT/JP2011/058606
§ 371 (c)(1),
(2), (4) Date: Jan. 15, 2013

(87) PCT Pub. No.: WO2011/129229
PCT Pub. Date: Oct. 20, 2011

(65) Prior Publication Data
US 2013/0114926 A1    May 9, 2013

(30) Foreign Application Priority Data
Apr. 16, 2010   (JP) .................................. 2010-095319

(51) Int. Cl.
*G02B 6/32*   (2006.01)
(52) U.S. Cl.
USPC ......................................................... 385/35

(58) Field of Classification Search
USPC .......................................... 385/15, 31, 33, 35
See application file for complete search history.

(56) References Cited

U.S. PATENT DOCUMENTS

2008/0080812 A1   4/2008   Kobayashi et al.

FOREIGN PATENT DOCUMENTS

| JP | 58-047803 U | 3/1983 |
| JP | 05-038606 U | 5/1993 |
| JP | 05-113519 A | 5/1993 |
| JP | 2005-077657 A | 3/2005 |
| JP | 2007-241094 A | 9/2007 |

OTHER PUBLICATIONS

International Search Report of PCT/JP2011/058606, mailing date May 10, 2011.

*Primary Examiner* — Charlie Peng
*Assistant Examiner* — Mary El Shammaa
(74) *Attorney, Agent, or Firm* — Westerman, Hattori, Daniels & Adrian, LLP

(57) ABSTRACT

In order to facilitate positioning of a collimator lens and an optical fiber while preventing cost increase, provided is an optical collimator having a holder (11) which has a cylindrical shape and is made of metal; a collimator lens (12) which is housed in a housing part (11*c*) formed at an end of the holder (11); and an optical fiber (13) which is inserted via an insertion hole (11*a*) formed at an opposite end of the holder (11) and is fixed at a predetermined position. At least one of the collimator lens (12) and an end surface of the optical fiber (13) is made to abut to a recess (11*e*) formed in proximity of the housing part (11*c*) of the holder (11) thereby to perform positioning.

13 Claims, 10 Drawing Sheets

OPTICAL COLLIMATOR, OPTICAL CONNECTOR USING SAME AND HOLDING MEMBER FOR OPTICAL COLLIMATOR

TECHNICAL FIELD

The present invention relates to an optical collimator used for gathering parallel light beams into an optical fiber and making light beams from the optical fiber parallel to each other, and also to an optical connector using the optical collimator and a holding member for the optical collimator.

BACKGROUND ART

An optical collimator is used to make light emitted from a light source propagate through an optical fiber and, if necessary, into the air or to input light propagating in the air into the optical fiber. In such an optical collimator, it is necessary to position a collimator lens and an end surface of the optical fiber. Conventionally, positioning of the collimator lens and the end surface of the optical fiber is performed by inserting a separate member like a spacer into a holding member (for example, see Patent Document 1) or by providing a spacer part in a holding member itself (for example, see Patent Document 2).

CITATION LIST

Patent Literature

[Patent Literature 1] Japanese Patent Application Laid-Open No. 2007-241094
[Patent Literature 2] Japanese Utility Model Application Laid-Open No. 5-38606

SUMMARY OF THE INVENTION

Technical Problem

Recently, there are expected high-capacity communications between machines or in a machine with use of optical fibers. An optical collimator used for this purpose is required to have smaller dimensions in shape and to maintain the positional relationship between the optical fiber and the collimator lens even when insertion and extraction of the fiber are repeated in a machine surface.

Positioning between the end surface of the optical fiber and the collimator lens in this optical collimator can be also performed by adoption of the method disclosed in the patent document 1 or 2. However, when the operation of inserting the separate member like a spacer into the holding member and the operation of providing the spacer part in the holding member itself become more difficult as the optical collimator becomes smaller in size and the costs required for the operations increase problematically.

The present invention was carried out in view of these problems and aims to provide an optical collimator, an optical connector using the optical collimator and a holding member for the optical collimator, the optical collimator being capable of positioning a collimator lens and an optical fiber easily while preventing cost increase.

Solution to Problem

The present invention provides an optical collimator comprising: a holding member which has a cylindrical shape and is made of metal; a collimator lens which is housed in a housing part formed at an end of the holding member; and an optical fiber which is inserted via an insertion hole formed at an opposite end of the holding member and is fixed at a predetermined position, wherein positioning is performed by making at least one of the collimator lens and an end surface of the optical fiber abut to a recess formed in the holding member in proximity of the housing part.

According to the above-described optical collimator, as positioning is performed by making at least one of the collimator lens and the optical fiber abut to the recess provided in the holding member, the collimator lens and/or the optical fiber can be positioned with reference to the recess. With this structure, it is possible to enhance the working efficiency as compared with the conventional case where a separate spacer is inserted into the holding member or a spacer part is provided in the holder member itself, thereby facilitating positioning of the collimator lens and the optical fiber while preventing cost increase.

In the above-described optical collimator, it is preferable that the recess comprises a plurality of recesses formed on one circumference of the holding member. In this case, as the plural recesses are formed on the same circumference, it is possible to make the collimator lens and/or the optical fiber abut to the recesses at the plural positions, thereby enhancing the positioning accuracy of the collimator lens and/or the optical fiber.

Besides, in the above-described optical collimator, it is preferable that a part of an optical fiber facing side of the recess forms an angle of 20 degrees or less with respect to a plane orthogonal to an insertion direction of the optical fiber and a part of the end surface of the optical fiber is made to abut to the recess. As the angle of the recess facing the optical fiber is thus set at 20 degrees or less with respect to the plane orthogonal to the insertion direction of the optical fiber, when the optical fiber has a core, a cladding covering the core and, if necessary, a reinforcement layer for reinforcing the optical fiber by covering the cladding and these end surfaces are in plane with each other (for example, plastic optical fiber), these positioning accuracy can be assured easily by making the end surface of the optical fiber abut to the recess. The angle of the part of the recess is most preferably 0 degree, however, desired positioning accuracy can be assured as far as the angle is 20 degrees or less.

Further, in the above-described optical collimator, it is preferable that a part of an optical fiber facing side of the recess forms an angle of 30 to 80 degrees inclusive with respect to a plane orthogonal to an insertion direction of the optical fiber, the optical fiber comprises a core, a cladding and a reinforcement layer, a part of the reinforcement layer is made to abut to the recess, and end surfaces of the core and cladding are arranged closer to the collimator lens than to an abutting point. Typically, a glass optical fiber is provided with a reinforcement layer which covers the cladding. This reinforcement layer is peeled at its end when the optical fiber is inserted into the optical collimator, and end surfaces of the core and cladding are jutting from the end surface of the reinforcement layer. Even when such a glass optical fiber is used, as the angle of the part of the optical fiber facing side of the recess is set to fall within a range of 30 to 80 degrees with respect to the plane orthogonal to the insertion direction of the optical fiber as described above, it becomes possible to insert the optical fiber into a narrow space surrounded by the recess smoothly and also to assure these positioning accuracy during the insertion process.

Still further, in the above-described optical collimator, it is preferable that a part of an optical fiber facing side of the recess and a part of a collimator lens facing side of the recess form different angles with respect to a plane orthogonal to an insertion direction of the optical fiber. As the angle of the part of the collimator lens facing side of the recess and the angle of the part of the optical fiber facing side of the recess are thus different from each other, it is possible to position the collimator lens and the optical fiber of different shapes effectively.

Still further, in the above-described optical collimator, it is preferable that a part of a collimator lens facing side of the recess constitutes an inclined surface, the inclined surface forms an angle of 0 to 45 degrees inclusive with respect to a plane orthogonal to an insertion direction of the optical fiber and a part of the collimator lens is made to abut to the recess. In this case, as positioning can be performed by supporting a part of the optical fiber side of the collimator lens, it is possible to enhance the positioning accuracy of the collimator lens.

Still further, in the above-described optical collimator, it is preferable that a surface of a part of a collimator lens facing side of the recess is subjected to removal processing thereby to form an abutting surface to the collimator lens. As the surface of the part of the collimator lens facing side of the recess is thus subjected to removal processing thereby to form the abutting surface to the collimator lens, it is possible to smooth the abutting surface of the recess to the collimator lens, thereby preventing any damage to the collimator lens and enhancing the positioning accuracy of the collimator lens. Here, the removal processing method may be cutting, pressing, grinding, energy beam processing or the like.

The present invention also provides an optical connector for connecting the optical collimator according to any one of the above-described aspects. With this optical connector, it is possible to obtain the same effects as those of the optical collimator described above.

The present invention also provides a holding member for an optical collimator comprising: a cylindrical part made of a metal material; a housing part provided at an end of the cylindrical part for housing a collimator lens; an insertion hole provided at an opposite end of the cylindrical part for inserting an optical fiber; and a recess provided on an outer circumference of the cylindrical part in proximity to the housing part for performing positioning by making at least one of an end surface of the optical fiber and the collimator lens abut to the recess.

According to the above-described holding member for the optical collimator, as the recess is provided in the cylindrical part in proximity to the housing part for positioning by making at least one of the collimator lens and the optical fiber abut to the recess, the collimator lens and/or the optical fiber can be positioned with reference to the recess. With this structure, it is possible to enhance the working efficiency as compared with the conventional case where a separate spacer is inserted into the holding member or a spacer part is provided in the holder member itself, thereby facilitating positioning of the collimator lens and the optical fiber while preventing cost increase.

In the holding member for the optical collimator, it is preferable that the recess comprises a plurality of recesses formed on one circumference of the holding member. In this case, as the plural recesses are formed on the same circumference, it is possible to make the collimator lens and/or the optical fiber abut to the recesses at the plural positions, thereby enhancing the positioning accuracy of the collimator lens and/or the optical fiber.

Besides, in the holding member for the optical collimator, it is preferable that a part of the recess facing the optical fiber inserted via the insertion hole forms an angle of 20 degrees or less with respect to a plane orthogonal to an insertion direction of the optical fiber. As the angle of the part of the optical fiber facing side of the recess is thus set at 20 degrees or less with respect to the plane orthogonal to the insertion direction of the optical fiber, when the optical fiber has a core, a cladding covering the core and, if necessary, a reinforcement layer for reinforcing the optical fiber by covering the cladding and these end surfaces are in plane with each other (for example, plastic optical fiber), it is possible to assure these positioning accuracy easily by making the end surface of the optical fiber abut to the recess.

Further, in the holding member for the optical collimator, it is preferable that a part of the recess facing the optical fiber inserted via the insertion hole forms an angle of 30 to 80 degrees inclusive with respect to a plane orthogonal to an insertion direction of the optical fiber. Typically, a glass optical fiber is provided with a reinforcement layer which covers the cladding. This reinforcement layer is peeled at its end when the optical fiber is inserted into the optical collimator, and end surfaces of the core and cladding are jutting from the end surface of the reinforcement layer. Even when such a glass optical fiber is used, as the angle of the part of the optical fiber facing side of the recess is set to fall within a range of 30 to 80 degrees inclusive with respect to the plane orthogonal to the insertion direction of the optical fiber as described above, it becomes possible to insert the optical fiber into a narrow space surrounded by the recess smoothly and also to assure these positioning accuracy during the insertion process.

Still further, in the holding member for the optical collimator, it is preferable that a part of the recess facing the optical fiber inserted via the insertion hole and a part of the recess facing the collimator lens housed in the housing part form different angles with respect to a plane orthogonal to an insertion direction of the optical fiber. As the angle of the part of the collimator lens facing side of the recess and the angle of the part of the optical fiber facing side of the recess are thus different from each other, it is possible to position the collimator lens and the optical fiber of different shapes effectively.

Still further, in the holding member for the optical collimator, it is preferable that a part of the recess facing the collimator lens housed in the housing part constitutes an inclined surface, and the inclined surface forms an angle of 0 to 45 degrees inclusive with respect to a plane orthogonal to an insertion direction of the optical fiber. In this case, as positioning can be performed by supporting a part of the optical fiber side of the collimator lens, it is possible to enhance the positioning accuracy of the collimator lens.

Still further, in the holding member for the optical collimator, it is preferable that removal processing is performed on a surface of a part of the recess facing the collimator lens housed in the housing part. In this case, as the surface of the part of the collimator lens facing side of the recess is subjected to removal, it is possible to smooth the abutting surface of the recess to the collimator lens, thereby preventing any damage to the collimator lens and enhancing the positioning accuracy of the collimator lens.

Technical Advantage of the Invention

According to the present invention, as positioning is performed by making at least one of the collimator lens and the optical fiber abut to the recess provided in the holding member, the collimator lens and/or the optical fiber can be positioned with reference to the recess. With this structure, it is possible to enhance the working efficiency as compared with the conventional case where a separate spacer is inserted into the holder holding member or a spacer part is provided in the holder member itself, thereby facilitating positioning of the collimator lens and the optical fiber while preventing cost increase.

DESCRIPTION OF EMBODIMENTS

Figure 1:
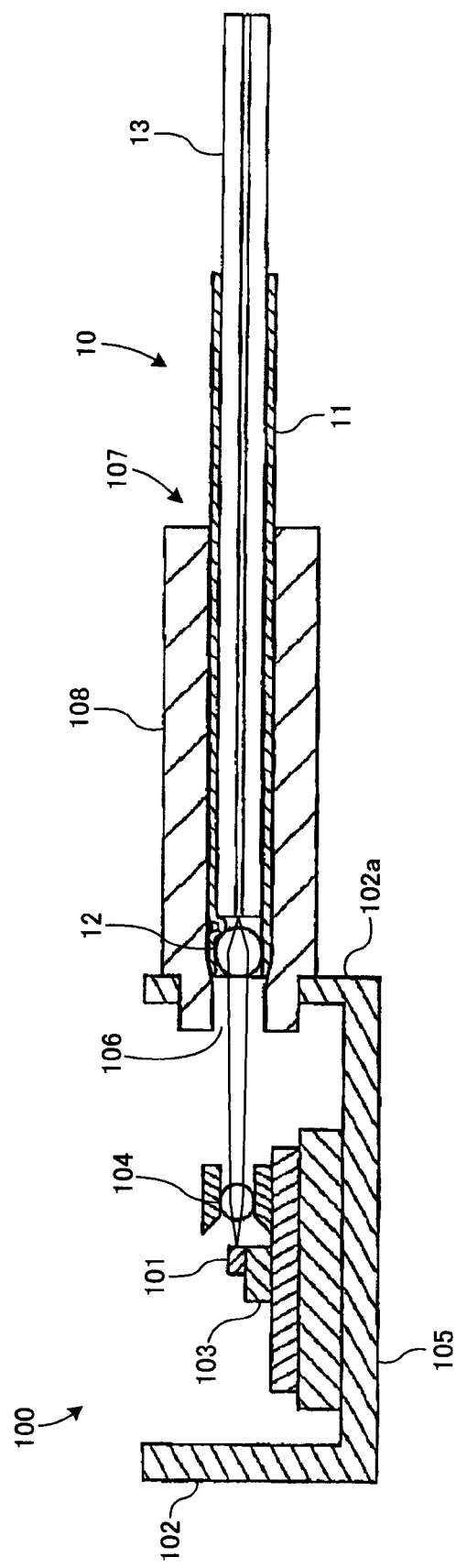
FIG. 1 is a lateral cross sectional view schematically illustrating an optical connector to which connected is an optical collimator according to the present invention.

Embodiments of the present invention will be specifically described below with reference to the accompanying drawings. First description is made about an optical connector which is connected to an optical collimator according to the present invention. FIG. 1 is a lateral cross sectional view schematically illustrating the optical connector which is connected to the optical collimator of the present invention. In FIG. 1, for convenience of explanation, it is assumed that the optical connector has a semiconductor laser chip as an optical source for emitting light to the optical collimator and an optical lens provided on an optical axis of the semiconductor laser chip. However, the structure of the optical connector is not limited to this and may be modified appropriately.

As illustrated in FIG. 1, the optical connector 100, to which the optical collimator of the present invention is connected, has a semiconductor laser unit 105 in which a semiconductor laser chip 101 is arranged on a mount table 103 of a case 102 and an optical lens 104 is arranged on the optical axis of the semiconductor laser chip 101. Besides, the optical connector 100 has an adaptor 108 which has an opening 106 placed on a side surface 102a of the case 102 and is provided for holding a holder 11 of the optical collimator 10 inserted through an insertion port 107.

In the semiconductor laser unit 105, laser light beams output from the semiconductor laser chip 101 are made parallel to each other by the optical lens 104 and brought into the opening 106. Then, these parallel light beams from the optical lens 104 are gathered by a collimator lens 12 of the optical collimator 10 and input into the optical fiber 13. Then, the input light propagates in the optical fiber 13.

The optical connector 100 according to the present embodiment is designed such that when the optical collimator 10 is inserted to a predetermined position of the adaptor 108, the optical lens 104 and the collimator lens 12 are positioned relative to each other, the laser light from the semiconductor laser chip 101 is input to the optical fiber 13 appropriately. The following description is made about the structure of the optical collimator 10 according to the present embodiment connected to such an optical connector 100.

Embodiment 1

Figure 2:
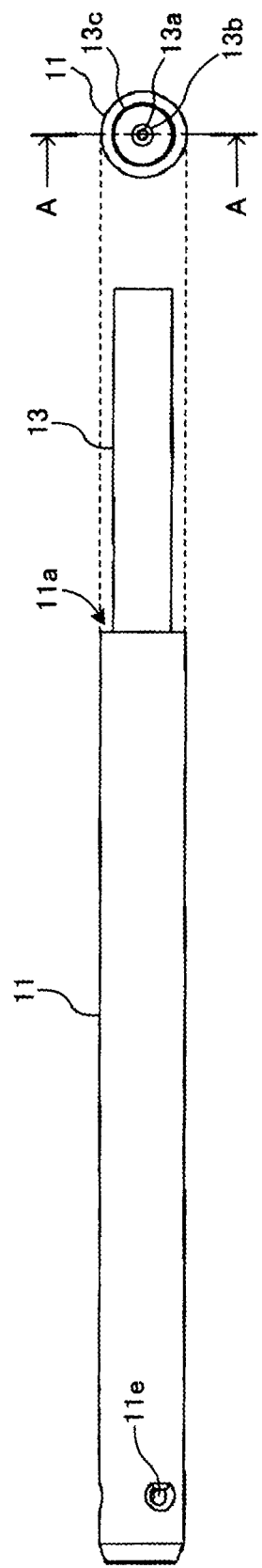
FIG. 2 is a side view of the optical collimator according to an embodiment 1 of the present invention.
Figure 3:
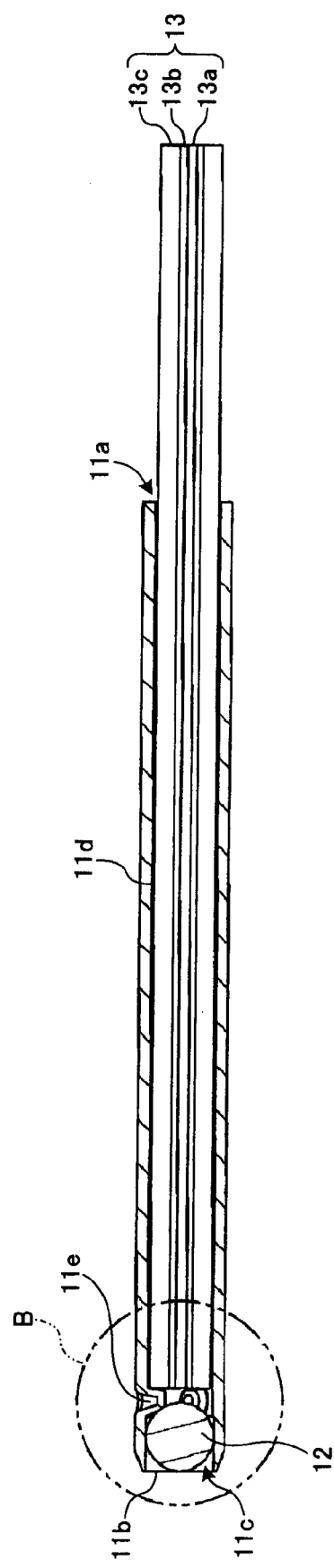
FIG. 3 is a cross sectional view taken along A-A of FIG. 2.

FIG. 2 is a side view of the optical collimator 10 according to the embodiment 1 of the present embodiment. FIG. 3 is a cross sectional view taken along A-A of FIG. 2. As illustrated in FIG. 2, the optical collimator 10 according to the embodiment 1 has the holder 11 as a holding member having an almost cylindrical shape; the collimator lens 12 which is held at an end of this holder 11; and the optical fiber 13 which is inserted through an insertion hole 11a provided at the other end of the holder 11. Here, in the optical collimator 10 according to the present embodiment, the optical fiber 13 inserted is preferably a plastic optical fiber.

The holder 11 is, for example, formed of a metal material such as stainless steels. Particularly, in view of machinability, the holder is preferably made of austenitic stainless steels. As illustrated in FIG. 3, at the end of a collimator lens 12 side of the holder 11, an opening 11b is provided. Inside this opening 11b, a housing part 11c is provided for housing the collimator lens 12. This housing part 11c is provided such that its dimensions are slightly smaller than the diameter of the collimator lens 12 so that the collimator lens 12 can be inserted with pressure. The housing part 11c is provided such that the collimator lens 12 can be housed entirely inside for the purpose of preventing any damage to the surface of the collimator lens 12. Besides, inside the holder 11, a through hole 11d is provided of which the diameter is slightly larger than the outer diameter of the optical fiber 13. This through hole 11d communicates with the insertion hole 11a and also with the housing part 11c. Further, in the holder 11, a plurality of recesses 11e is provided in the holder 11 by pressure-pressing its outer periphery with use of a tool. These recesses 11e are provided between the housing part 11c and the through hole 11d and, as described later, the recesses 11e are used for positioning the collimator lens 12 and the optical fiber 13.

The collimator lens 12 is, for example, made of a glass material and consists of a ball lens having a spherical shape. As illustrated in FIG. 3, while it is housed in the housing part 11c of the holder 11, the collimator lens 12 faces the opening 106 of the adapter 108 via the opening 11b and also the tip end of the optical fiber 13 inserted in the through hole 11d.

The optical fiber 13 is, for example, made of a plastic optical fiber and has a core 13a provided through its center, a cladding 13b covering the core 13a and a reinforcement layer 13c for covering the cladding 13b for reinforcement. In an end surface of the optical fiber 13 facing the collimator lens 12 (end surface of the collimator lens 12 facing side of the optical fiber 13), the core 13a, cladding 13b and the reinforcement layer 13c are arranged in plan with each other. That is, in the end surface of the collimator lens 12 facing side of the optical fiber 13, the core 13a, the cladding 13b and the reinforcement layer 13c are arranged in alignment.

Further, the optical fiber 13 is inserted through the through hole 11d via the insertion hole 11a and fixed such that the tip end of the optical fiber 13 is placed near the collimator lens 12 to face its spherical surface. In this case, the optical fiber 13 is, for example, fixed to the holder 11 with use of an adhesive agent applied between the optical fiber and the inner peripheral surface of the through hole 11d. Here, fixation of the optical fiber 13 to the holder 11 is not limited to this, and any fixation method may be applicable.

In the optical collimator 10 according to the embodiment 1, for example, the optical fiber 13 is a Graded-index (GI) optical fiber of which the refractive index varies continuously in a cross section vertical to the fiber axis. Besides, the core 13a and the cladding 13b are made of, for example, perfluorinated optical resin in which hydrogen of carbon-hydrogen bond is replaced with fluorine. As the optical fiber 13 is a GI optical fiber and is made of perfluorinated optical resin, it is possible to realize higher speed and large capacity communications.

In the thus structured optical collimator 10 according to the embodiment 1, the recesses 11e are provided at the holder 11, which are used to facilitate positioning of the collimator lens 12 and the optical fiber 13 while preventing cost increase. Specifically, positioning is performed by making a part of the optical fiber 13 and the collimator lens 12 abut to the recesses 11e of the holder 11, thereby eliminating the need to provide any spacer for positioning. Accordingly, it becomes possible to prevent cost increase and facilitate positioning of the collimator lens 12 and the optical fiber 13.

Figure 4:
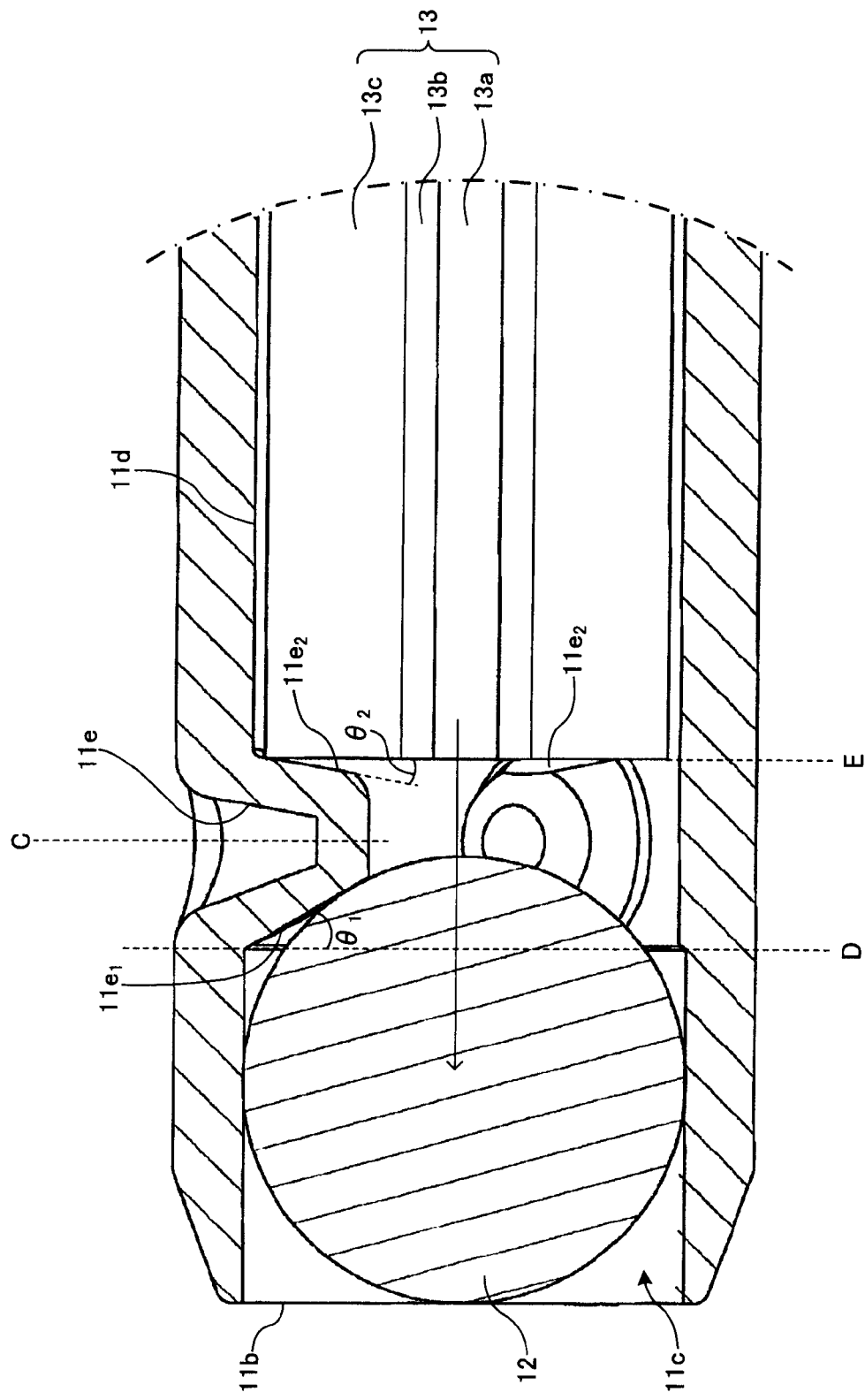
FIG. 4 is an enlarged view of the chain double-dashed line circle B of FIG. 3.

Here, description is made, with reference to FIG. 4, about the method of positioning the optical fiber 13 and the collimator lens 12 in the holder 11 of the optical collimator 10 according to the embodiment 1. FIG. 4 is an enlarged view of the chain double-dashed line circle B of FIG. 3. As illustrated in FIG. 4, in the recesses 11e, a part facing the collimator lens 12 abuts to a part of the collimator lens 12, and a part facing the optical fiber 13 abuts to a part of the reinforcement layer 13c and/or the cladding 13b of the optical fiber 13 other than the core 13a. In such an abutting state, the collimator lens 12 and the optical fiber 13 are positioned at their respective positions of the holder 11.

As illustrated in FIG. 4, each recess 11e is provided such that the angle formed by the part facing the collimator lens 12 and the plane orthogonal to the insertion direction of the optical fiber 13 (for example, the plane C arranged in parallel to the end surface of the optical fiber 13 shown in FIG. 4 and passing through the center of the recess 11e) differs from the angle formed by the part facing the optical fiber 13 and the same plane. This recess 11e is formed, for example, by pressing with use of a tapered tool with a tip end of different shape. As the recess 11e is formed by pressing with this tool, the shape of the part of the recess 11e facing the collimator lens 12 and the shape of the part facing the optical fiber 13 are asymmetric with respect to the center axis in pressing. Thus, as the angle of the part of the recess 11e facing the collimator lens 12 is differentiated from the angle facing the optical fiber 13, it is possible to position the collimator lens 12 and the optical fiber 13 of different shapes effectively.

Besides, in the optical collimator 10 according to the embodiment 1, such a recess 11e is provided in plurality and the recesses 11e (three recesses in the present embodiment) are formed on the same circumference of the holder 11. Forming of the recesses 11e on the same circumference is performed, for example, by pressing the outer periphery of the holder 11 with use of the above-mentioned tapered tools with the tip ends of different shapes simultaneously. As the plural recesses 11e are thus provided on the same circumference, the collimator lens 12 and the optical fiber 13 can be made to abut at plural positions, thereby enabling highly accurate positioning of the collimator lens 12 and the optical fiber 13.

The part of the recess 11e facing the collimator lens 12 (the part of the collimator lens 12 facing side of the recess 11e) forms an inclined surface $11e_1$. This inclined surface $11e_1$ form an angle $\theta_1$ of 0 to 45 degrees with respect to the plane orthogonal to the insertion direction of the optical fiber 13 indicated by the arrow in FIG. 4 (for example, the plane D which is arranged in parallel with the end surface of the optical fiber 13 shown in FIG. 4 and passing through the base end part of the recess 11e). As the inclined surface $11e_1$ on the collimator lens 12 side forms the angle $\theta_1$ of 0 to 45 degrees with respect to the plane D orthogonal to the insertion direction of the optical fiber 13, positioning can be performed while the part of the optical fiber 13 side of the collimator lens 12 is supported, thereby enhancing the positioning accuracy of the collimator lens 12.

Further, in the optical collimator 10 according to the embodiment 1, a surface of the part of the collimator lens 12 facing side of the recess 11e is subjected to removal by energy beams, grinding, pressing, and cutting thereby to form the abutting surface to the collimator lens 12. As the abutting surface to the collimator lens 12 is thus formed by performing removal on the surface of the recess 11e facing the collimator lens 12, the abutting surface of the recess 11e to the collimator lens 12 can be flattened, thereby preventing any damage to the collimator lens 12 and further improving the positioning accuracy of the collimator lens 12. Here, the removal operation is performed in the same way on the optical collimators 20, 30 according to the embodiments 2, 3 described later.

On the other hand, the part of the recess 11e facing the optical fiber 13 (the part of the optical fiber 13 facing side of the recess 11e) forms an inclined surface $11e_2$. The inclined surface $11e_2$ is provided to form an angle $\theta_2$ of 20 degrees or less with respect to the plane orthogonal to the insertion direction of the optical fiber 13 (for example, the plane E which is arranged in parallel with the end surface of the optical fiber 13 illustrated in FIG. 4). As the inclined surface $11e_2$ is thus provided to form the angle of 20 degrees or less with respect to the plane E, when the optical fiber 13 is an optical fiber with the core 13a, the cladding 13b and the reinforcement layer 13c arranged in plane with each other (for example, plastic optical fiber), the end surface of the optical fiber 13 is made to abut to the recess 11e, thereby assuring their high positioning accuracy.

As described up to this point, in the optical collimator 10 according to the embodiment 1, the collimator lens 12 and the optical fiber 13 are positioned by making a part of the collimator lens 12 and a part of the optical fiber 13 abut to the recess 11e provided in the holder 11. With this structure, as the collimator lens 12 and the optical fiber 13 can be positioned with reference to the recess 11e, it is possible to improve the working efficiency as compared with the case of inserting a separate member like a spacer into the holder 11 or providing a spacer part in the holder 11 itself, thereby facilitating positioning of the collimator lens 12 and the optical fiber 13 while preventing cost increase.

For example, in an optical collimator used for high-capacity communications between machines or in a machine with use of optical fibers, if a partition wall (spacer part) is formed for positioning an optical fiber and a collimator lens like in the conventional example, there is need to perform processing such as cutting on a holding member made of a metal material or the like. However, as to the holding member of the optical collimator used for the above-mentioned purpose, its size is reduced, which causes reduction of cutting accuracy and remarkable increase of processing costs (for example, costs due to occurrence of dimensional error products). On the other hand, in the holder 11 of the optical collimator 10 according to the embodiment 1, as the recess 11e is formed by deformation processing, instead of the partition wall (spacer part) formed by cutting in the holder 11 as holding member, thereby reducing the processing cost drastically. For example, the costs can be reduced to about ½ or ⅔ of the costs for processing by cutting mentioned above.

In addition, in the holder 11 of the optical collimator 10 according to the embodiment 1, while the collimator lens 12 and the optical fiber 13 are positioned with use of the recess 11e, the optical fiber 13 is fixed with use of any adhesive agent applied to the inner peripheral surface of the through hole 11d. In this case, as the through hole 11d has a length long enough to fix the optical fiber 13, the optical fiber 13 can be fixed firmly while it is positioned. Accordingly, the positional relationship between the optical fiber 13 and the collimator lens 12 can be maintained even when insertion and extraction are repeated for the high-capacity communications between machines or in a machine using optical fibers.

Here, in the above description, it is assumed that the collimator lens 12 and the optical fiber 13 are positioned by making the part of the collimator lens 12 and the part of the optical fiber 13 abut to the recess 11e provided in the holder 11. However, this method of positioning of the collimator lens 12 and the optical fiber 13 is not limited to this method and may be modified appropriately. For example, instead that both of the collimator lens 12 and the optical fiber 13 are made to abut to the recess 11e, either one of the collimator lens 12 and the optical fiber 13 may be made to abut to the recess 11e and the other may be positioned by a part of the holder 11 other than the recess 11e. However, in this case, it is assumed that the part of the holder 11 to position the other is designed to have a predetermined positional relationship with the recess 11e. That is, the present invention includes an idea of the optical collimator 10 in which one of the collimator lens 12 and the optical fiber 13 is made to abut to the recess 11e.

Embodiment 2

The optical collimator according to the embodiment 2 is different from the optical collimator according to the embodiment 1 in the structure of the optical fiber to insert and the shape of the recess for positioning the optical fiber. The following description is made about the structure of the optical collimator according to the embodiment 2 and mainly about the differences from the optical collimator 10 according to the embodiment 1.

Figure 5:
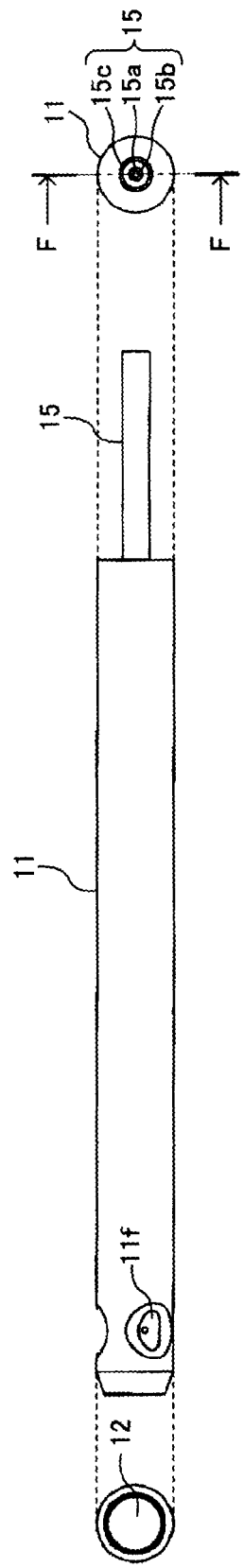
FIG. 5 is a side view of an optical collimator according to an embodiment 2 of the present invention.
Figure 6:
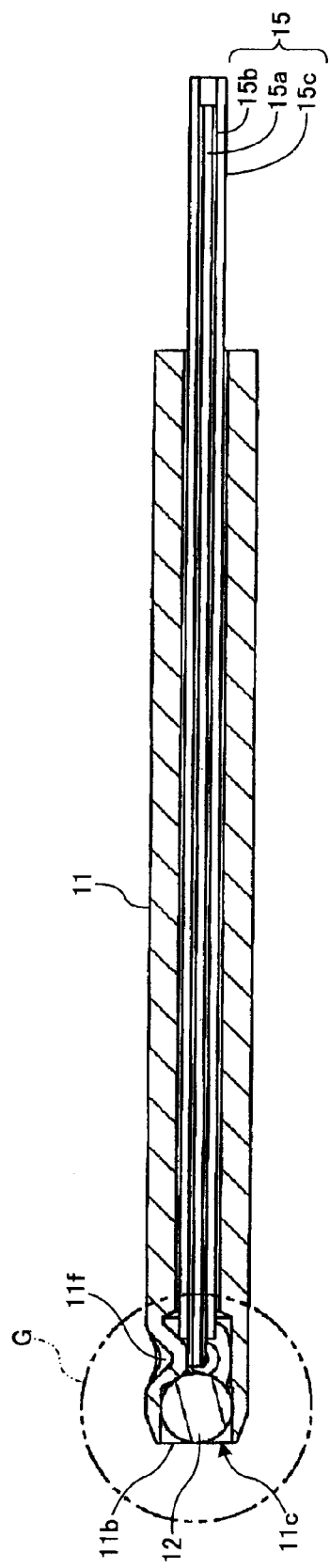
FIG. 6 is a cross sectional view taken along F-F of FIG. 5.
Figure 7:
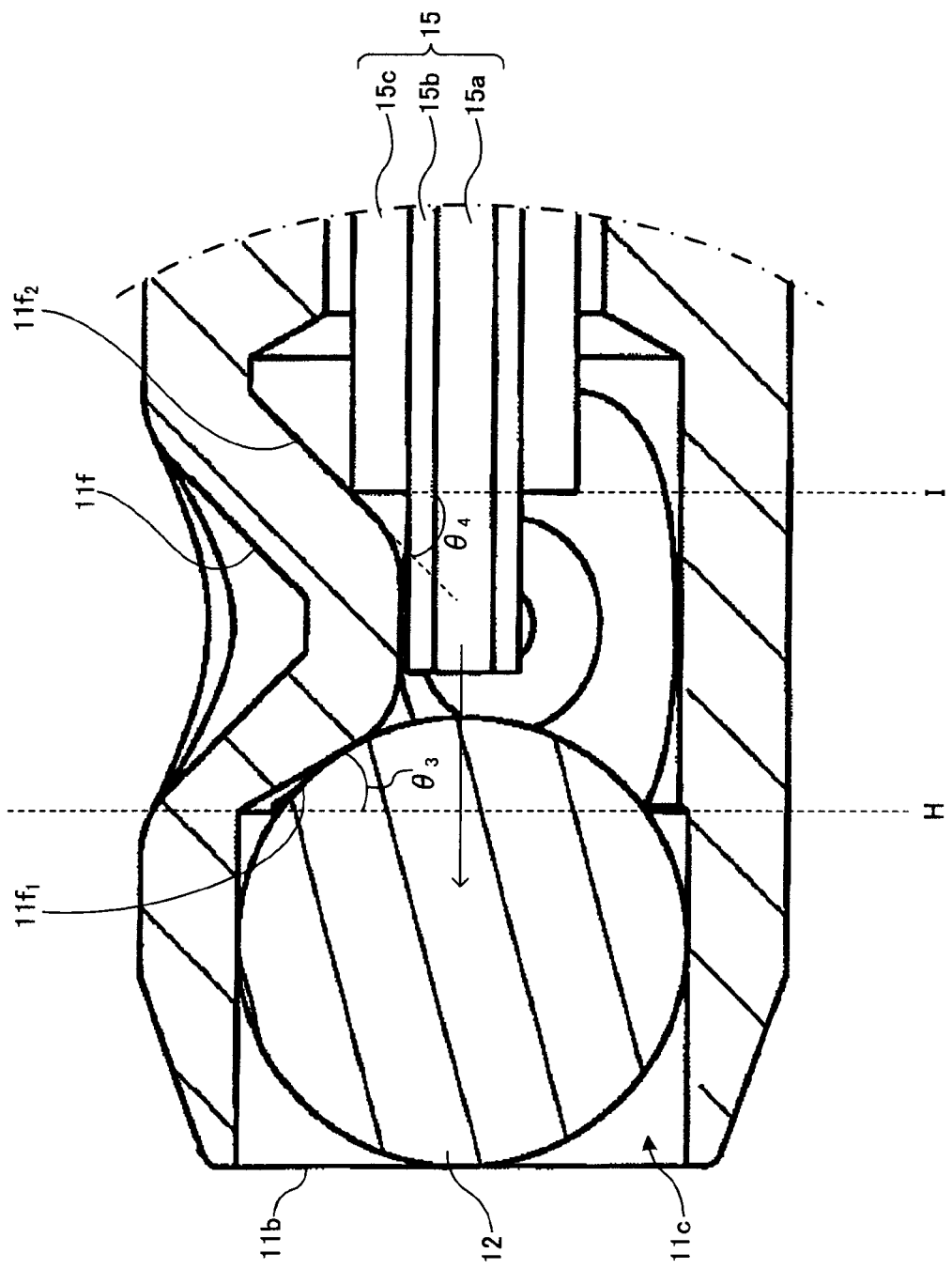
FIG. 7 is an enlarged view of the chain double-dashed line circle G of FIG. 6.

FIG. 5 is side view of the optical collimator 20 according to the embodiment 2 of the present invention. FIG. 6 is a cross sectional view taken along F-F of FIG. 5. FIG. 7 is an enlarged view of the chain double-dashed line circle G shown in FIG. 6. Here, in FIGS. 5 to 7, the like elements to those of the optical collimator 10 according to the embodiment 1 in FIGS. 2 to 4 are denoted by the like reference numerals, and their explanation will be omitted here.

An optical fiber 15 to be inserted to the optical collimator 20 according to the embodiment 2 is manufactured as a glass optical fiber, having a core 15a running through its center, a cladding 15b covering the core 15a and a reinforcement layer 15c further covering the cladding 15b. The optical fiber 15 is made, for example, of a glass material.

As illustrated in FIG. 6, in the optical fiber 15, the reinforcement layer 15c is removed at an end surface of the collimator lens 12 facing side of the optical fiber 15 and the cladding 15b and the core 15a protrude toward the collimator lens 12. In other words, at the end surface of the collimator lens 12 facing side of the optical fiber 15, the core 15a and the cladding 15b are jutting from the end surface of the reinforcement layer 15c toward the collimator lens 12.

As illustrated in FIG. 6, the thickness of the holder 11 at the insertion part of the optical fiber is different from that at the part near the recess 11f and the housing part 11c. This is for the purpose of assuring a constant force of holding the optical fiber 15 by reducing in some measure the difference between the optical fiber 15 and the inner diameter of the holder 11 when the optical fiber 15 has a small outer diameter (for example, a glass optical fiber). If the holder 11 has a predetermined thickness or more, there arises a problem in forming the recess 11f. Therefore, the above-mentioned part is made thinner, for example, by cutting in advance. As the holder 11 is thus structured, even when the optical fiber 15 of small outer diameter (for example, glass optical fiber) is used, it is possible to hold the optical fiber 15 at the predetermined position of the holder 11 and to form the recess 11f for positioning the collimator lens 12 and the optical fiber 15 into a desired shape.

Between the housing part 11c and the through hole 11d in the holder 11, the recess 11f is formed for positioning the collimator lens 12 and the optical fiber 15. This recess 11f is different in shape from the recess 11e of the embodiment 1 because of the structure of the above-mentioned optical fiber 15. Specifically, the shape of a part of the optical fiber 15 facing side of the recess 11f is different from that of the recess 11e of the embodiment 1. The shape of the recess 11f is described later.

Here, description is made about the method of positioning the optical fiber 15 and the collimator lens 12 in the holder 11 of the optical collimator 20 with such a recess 11f. As illustrated in FIG. 7, in the recess 11f, a part of the collimator lens 12 facing side of the recess 11f abuts to a part of the collimator lens 12 and a part of the optical fiber 15 facing side of the recess 11f abuts to a part of the reinforcement layer 15c of the optical fiber 15. In this case, the core 15a and the cladding 15b are arranged jutting toward the collimator lens 12 from the abutting position to the recess 11f. The collimator lens 12 and the optical fiber 15 in the abutting state are then, positioned at the respective predetermined positions in the holder 11.

As illustrated in FIG. 7, a part of the collimator lens 12 facing side of the recess 11f forms an inclined surface $11f_1$. This inclined surface $11f_1$ has the same structure as the inclined surface $11e_1$ of the recess 11e of the embodiment 1 and forms an angle $\theta_3$ of 0 to 45 degrees with respect to the plane orthogonal to the insertion direction of the optical fiber 15 indicated by the arrow in FIG. 7 (for example, the plane H which is arranged in parallel with the end surface of the optical fiber 15 illustrated in FIG. 7 and passes through the base end part of the recess 11f). In this way, as the angle $\theta_3$ of the inclined surface $11f_1$ of the collimator lens 12 facing side is set to fall between 0 and 45 degrees inclusive with respect to the plane H which is orthogonal to the insertion direction of the optical fiber 15, the spherical collimator lens 12 can be positioned while a part of the optical fiber 15 side of the collimator lens 12 is supported, thereby enhancing the positioning accuracy of the collimator lens 12.

Meanwhile, the part of the optical fiber 15 facing side of the recess 11f forms an inclined surface $11f_2$. The inclined surface $11f_2$ forms an angle $\theta_4$ of 30 to 80 degrees inclusive with respect to the plane orthogonal to the insertion direction of the optical fiber 15 (for example, the plane I which is arranged in parallel with the end surface of the reinforcement layer 15c of the optical fiber 15 illustrated in FIG. 7). As the angle of the part of the optical fiber 15 facing side of the recess 11f is set to fall within a range of 30 to 80 degrees inclusive with respect to the plane I which is orthogonal to the insertion direction of the optical fiber 15, when the optical fiber 15 is an optical fiber made of the core 15a, the cladding 15b and the reinforcement layer 15c as described above, the core 15a and the cladding 15b jutting from the end surface of the reinforcement layer 15c (for example, glass optical fiber), it is possible to insert the optical fiber 15 smoothly and to assure the high positioning accuracy of the collimator lens 12 and the optical fiber 15.

As described above, in the optical collimator 10 according to the embodiment 2, the collimator lens 12 and the optical fiber 15 are partially made to abut to the recess 11f provided in the holder 11 and thereby positioned. With this structure, as the collimator lens 12 and the optical fiber 15 can be positioned with reference to the recess 11f, it is possible to improve the working efficiency as compared with the conventional way of inserting a separate member like a spacer into the holder 11 or forming a spacer part at the holder 11 itself, thereby facilitating the positioning of the collimator lens 12 and the optical fiber 15 while preventing cost increase.

Here, the optical collimator 20 according to the embodiment 2 is the same as the optical collimator 10 according to the embodiment 1 in that the angle of the recess 11f at the part of the collimator lens 12 facing side is different from that at the part of the optical fiber 15 facing side and the recess 11f is provided in plurality on the same circumference of the holder 11. Therefore, the optical collimator 20 of the embodiment 2 can produce the same effect due to the structure of the recess 11f.

Embodiment 3

An optical collimator according to the embodiment 3 is different from the optical collimator 10 according to the embodiment 1 in the structure of the recess. The following description will be made mainly about the difference of the structure of the optical collimator of the embodiment 3 from that of the optical collimator 10 according to the embodiment 1.

Figure 8:
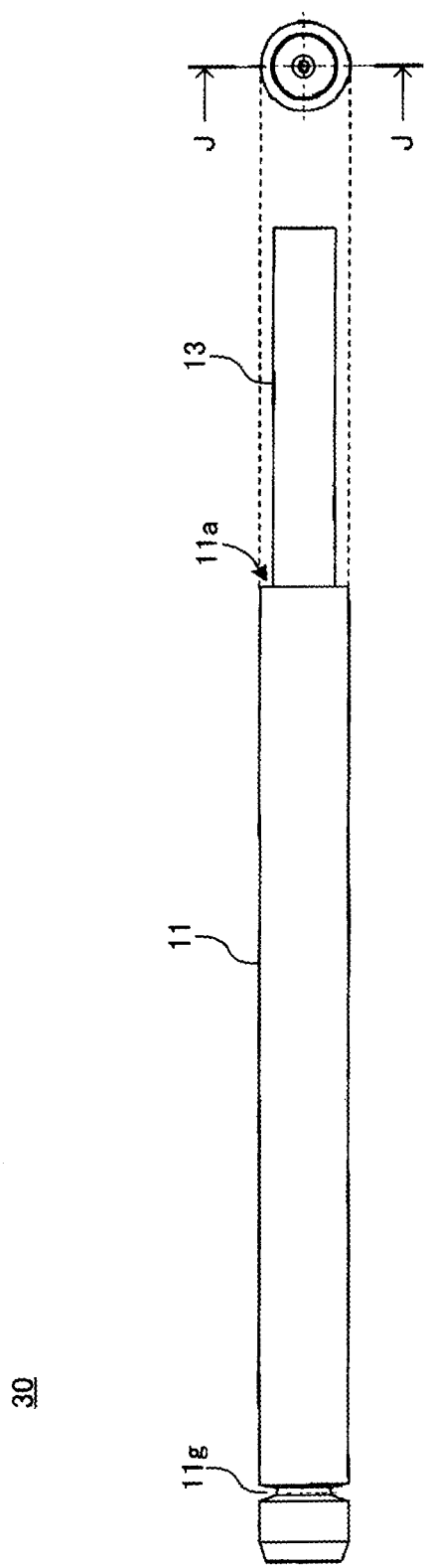
FIG. 8 is a side view of an optical collimator according to an embodiment 3 of the present invention.
Figure 9:
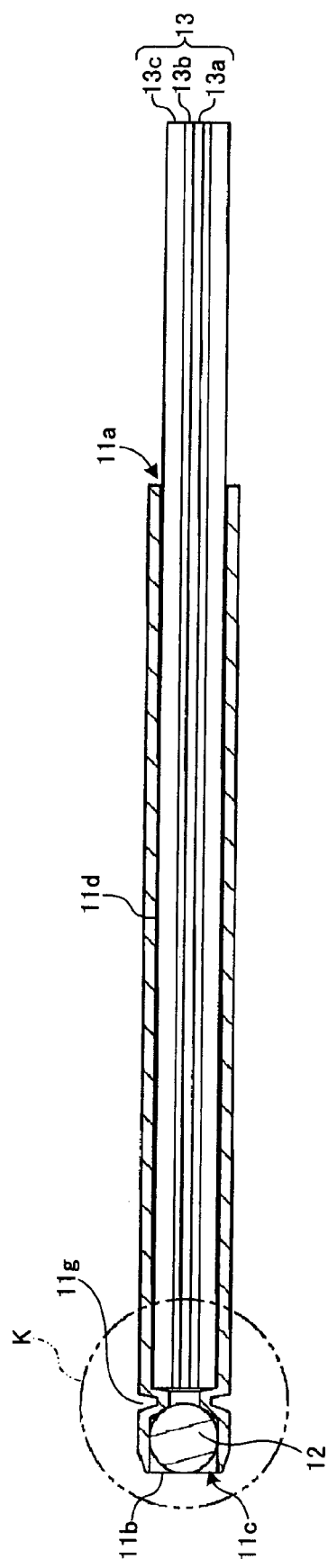
FIG. 9 is a cross sectional view taken along J-J of FIG. 8.
Figure 10:
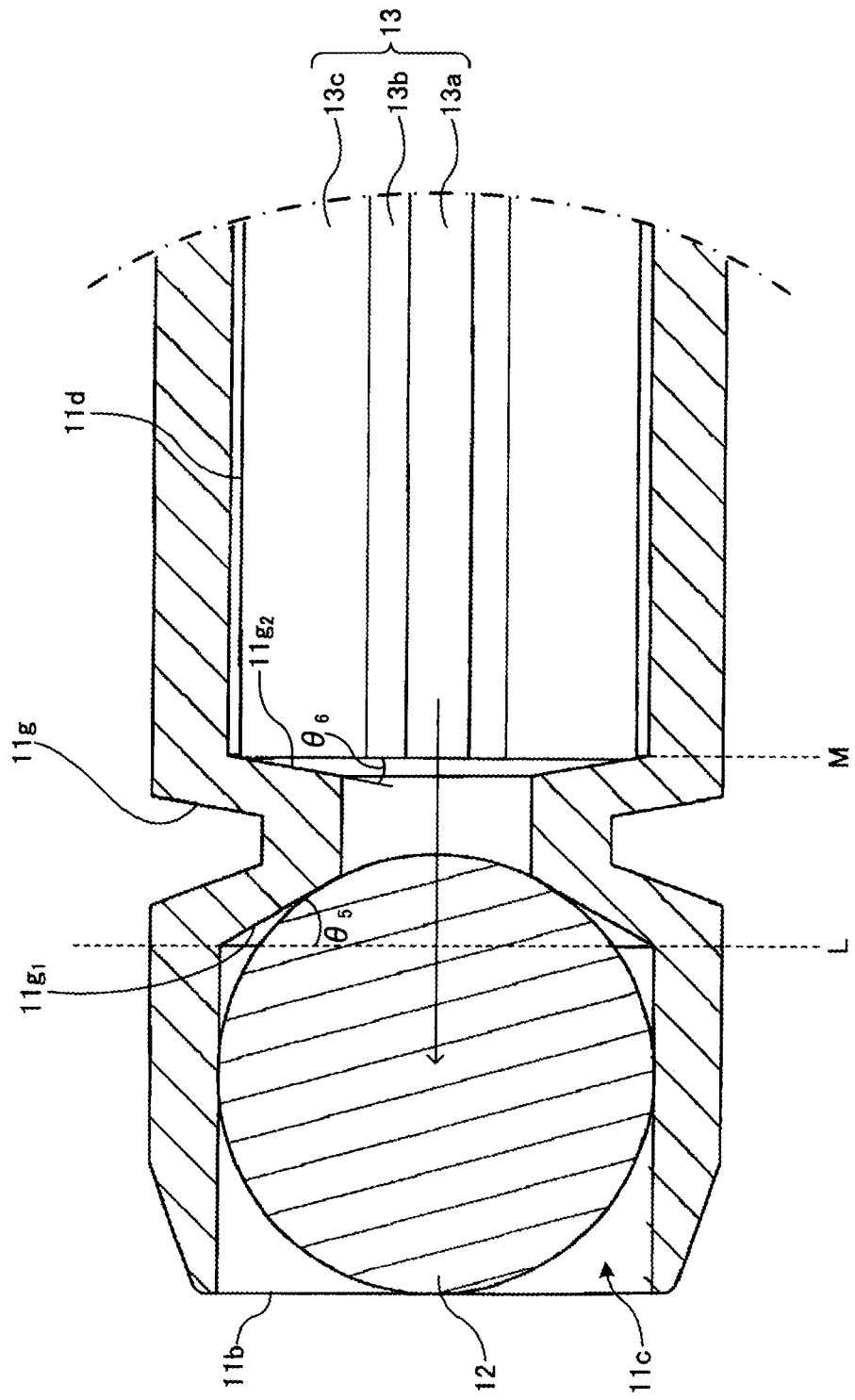
FIG. 10 is an enlarged view of the chain double-dashed line circle K of FIG. 9.

FIG. 8 is a side view of the optical collimator 30 according to the embodiment 3 of the present invention. FIG. 9 is a cross sectional view taken along J-J of FIG. 8. FIG. 10 is an enlarged view of the chain double-dashed line circle K shown in FIG. 9. Here, in FIGS. 8 to 10, the like elements to those of the optical collimator 10 according to the embodiment 1 shown in FIGS. 2 to 4 are denoted by the like reference numerals, and their explanation will be omitted here.

In the optical collimator 30 according to the embodiment 3, the recess 11g is provided between the housing part 11c and the through hole 11d, throughout its circumference of the holder 11 as illustrated in FIGS. 8 and 9. That is, the recess 11g is provided like an annular depression formed in the holder 11 between the housing part 11c and the through hole 11d. The recess 11g is, for example, formed by pressing the outer circumference of the holder 11 with use of a diameter-changeable annular tool.

Here, the next description is made about the method of positioning of the optical fiber 13 and the collimator lens 12 in the holder 11 of the optical collimator 30 provided with the recess 11g described above. As illustrated in FIG. 10, in the recess 11g, a part of the collimator lens 12 facing side of the recess 11g abuts to a part of the collimator lens 12 and a part of the optical fiber 13 facing side of the recess abuts to a part of the reinforcement layer 13c and/or the cladding 13b of the optical fiber 13. The collimator lens 12 and the optical fiber 13 in the abutting state are then, positioned at respective predetermined positions in the holder 11.

The part of the collimator lens 12 facing side of the recess 11g forms an inclined surface $11g_1$. This inclined surface $11g_1$ forms an angle $\theta_5$ of 0 to 45 degrees inclusive with respect to the plane orthogonal to the insertion direction of the optical fiber 13 indicated by the arrow in FIG. 10 (for example, the plane L which is arranged in parallel with the end surface of the optical fiber 13 illustrated in FIG. 10 and passes through the base end part of the recess 11g), like in the recess 11e of the embodiment 1. As the inclined surface $11g_1$ of the collimator lens 12 side of the recess 11g is thus arranged to form the angle $\theta_5$ of 0 to 45 degrees inclusive with respect to the plane L orthogonal to the center axis of the insertion direction of the optical fiber 13, the spherical collimator lens 12 can be positioned while the part of the optical fiber 13 side of the collimator lens 12 is supported, thereby enhancing the positioning accuracy of the collimator lens 12.

Meanwhile, a part of the optical fiber 13 facing side of the recess 11g forms an inclined surface $11g_2$. The inclined surface $11g_2$ is provided to form an angle $\theta_6$ of 20 degrees or less with respect to the plane orthogonal to the insertion direction of the optical fiber 13 (for example, the plane M arranged in parallel with the end surface of the optical fiber 13 illustrated in FIG. 10), like in the recess 11e of the embodiment 1. As the inclined surface $11g_2$ is thus provided to form the angle $\theta_6$ of 20 degrees or less with respect to the plane M, when the optical fiber 13 is an optical fiber in which the core 13a and the cladding 13b are arranged in plane with each other (for example, plastic optical fiber), the end surface of the optical fiber 13 can be made to abut to the recess 11g, thereby assuring the high positioning accuracy easily. Therefore, the angle of the recess is most preferably 0 degree, but desired positioning accuracy can be assured as far as the angle is 20 degree or less.

As described above, in the optical collimator 30 according to the embodiment 3, positioning is performed by making the part of the collimator lens 12 and the part of the optical fiber 13 abut to the recess 11g provided in the holder 11. With this structure, as the collimator lens 12 and the optical fiber 13 can be positioned with reference to the recess 11g, it is possible to improve the working efficiency as compared with the conventional example of inserting a separate member like a spacer into the holder 11 or forming a spacer part in the holder 11 itself, thereby facilitating the positioning of the collimator lens 12 and the optical fiber 13 while preventing the cost increase.

Here, the optical collimator 30 according to the embodiment 3 is the same as the optical collimator 10 according to the embodiment 1 in that the angle of the part of the collimator lens 12 facing side of the recess 11g and the angle of the part of the optical fiber 13 facing side of the recess 11g are different from each other. Therefore, the optical collimator 30 according to the embodiment 3 can also have the same effect due to the structure of the recess 11g.

Here, the present invention is not limited to the above-described embodiments and may be embodied in various modified forms. In the above-described embodiments, the sizes and shapes of the elements illustrated in the accompanying drawings are not intended to restrict the present invention, and may be modified appropriately as far as the effect of the present invention can be exerted. Other modifications may be added without departing from the scope of the aim of the present invention.

For example, in the above-described embodiments, it is assumed that the collimator lens 12 of the optical collimator 10 (20, 30) is made of a glass material, however, the structure of the collimator lens 12 is not limited to this, but may be modified appropriately. For example, the collimator lens 12 may be made of a plastic material and the lens shape is not limited to the spherical shape.

Further, in the above-described embodiment 1, a plastic optical fiber is taken as an example of the optical fiber 13 applicable to the optical collimator 10 according to the embodiment 1, however, it is not intended to restrict the present invention. The optical fiber may be a glass optical fiber as far as the end surface of the optical fiber on the collimator lens 12 side is flattened.

Further, in the above-described embodiment 2, the glass optical fiber is taken as an example of the optical fiber 15, however, the optical fiber 15 applicable to the optical collimator 20 according to the embodiment 2 is not limited to the glass optical fiber. For example, the optical fiber may be a plastic optical fiber as far as a part of the end surface of the collimator lens 12 side of the optical fiber is arranged jutting. For example, this plastic optical fiber may be such that a coating layer for coating the outer circumference of the cladding is formed and the core and the cladding are only jutting from the end surface of the coating layer.

Further, in the above-described embodiments, the present invention is embodied in the optical collimator 10 (20, 30) and the optical connector connected thereto. However, the present invention is not limited to these and may be embodied in the holding member for the optical collimator which is comprised of the holder 11 provided in the above-mentioned optical collimator 10 (20, 30). In this case, the holding member for the optical collimator has, for example, a cylindrical part composed of the holder 11 entirely, a housing part 11c provided at an end of the cylindrical part for housing the collimator lens 12, an insertion hole 11a provided at the other end of the cylindrical part for inserting the optical fiber 13 (15), and a recess 11e (11f, 11g) provided in the outer circumference of the cylindrical part 11c in the vicinity of the housing part 11c for making at least one of the collimator lens 12 and the optical fiber 13 (15) abut to the recess to position them.

According to the holding member for the optical collimator according to the present invention, the recess 11e (11f, 11g) is formed in the vicinity of the housing part 11c for making at least one of the collimator lens 12 and the optical fiber 13 (15) abut to the recess 11e (11f, 11g) to position them. With this structure, the collimator lens 12 and the optical fiber 13 (15) can be positioned with reference to the recess 11e (11f, 11g), it is possible to improve the working efficiently as compared with the conventional example in which a separate member like a spacer is inserted into the holding member or a spacer part is provided in the holding member itself, thereby facilitating the positioning of the collimator lens 12 and the optical fiber 13 while preventing the cost increase.

The present application is based on Japanese Patent Application No. 2010-095319 filed on Apr. 16, 2010, entire content of which is expressly incorporated by reference herein.

The invention claimed is:

1. An optical collimator comprising: a holding member which has a cylindrical shape and is made of metal; a collimator lens which is housed in a housing part formed at an end of the holding member; and an optical fiber which is inserted via an insertion hole formed at an opposite end of the holding member and is fixed at a predetermined position, wherein positioning is performed by making at least one of the collimator lens and an end surface of the optical fiber abut to an abutting surface that is formed by forming a recess at an outer circumference of the holding member in proximity of the housing part.

2. The optical collimator according to claim 1, wherein a part of an optical fiber facing side of the abutting surface forms an angle of 20 degrees or less with respect to a plane orthogonal to an insertion direction of the optical fiber and a part of the end surface of the optical fiber is made to abut to the abutting surface.

3. The optical collimator according to claim 1, wherein a part of an optical fiber facing side of the abutting surface forms an angle of 30 to 80 degrees inclusive with respect to a plane orthogonal to an insertion direction of the optical fiber, the optical fiber comprises a core, a cladding and a reinforcement layer, a part of the reinforcement layer is made to abut to the abutting surface, and end surfaces of the core and cladding are arranged closer to the collimator lens than to an abutting point.

4. The optical collimator according to claim 1, wherein a part of an optical fiber facing side of the abutting surface and a part of a collimator lens facing side of the abutting surface form different angles with respect to a plane orthogonal to an insertion direction of the optical fiber.

5. The optical collimator according to claim 1, wherein a part of a collimator lens facing side of the abutting surface constitutes an inclined surface, the inclined surface forms an angle of 0 to 45 degrees inclusive with respect to a plane orthogonal to an insertion direction of the optical fiber and a part of the collimator lens is made to abut to the abutting surface.

6. The optical collimator according to claim 1, wherein a surface of a part of a collimator lens facing side of the abutting surface is subjected to removal processing thereby to form an abutting surface to the collimator lens.

7. An optical connector for connecting the optical collimator according to anyone of claims 1, 2 to 6.

8. A holding member for an optical collimator comprising: a cylindrical part made of a metal material; a housing part provided at an end of the cylindrical part for housing a collimator lens; and an insertion hole provided at an opposite end of the cylindrical part for inserting an optical fiber, wherein positioning is performed by making at least one of the collimator lens and an end surface of the optical fiber abut to an abutting surface that is formed by forming a recess at an outer circumference of the cylindrical part in proximity to the housing part.

9. The holding member for the optical collimator according to claim 8, wherein a part of the abutting surface facing the optical fiber inserted via the insertion hole forms an angle of 20 degrees or less with respect to a plane orthogonal to an insertion direction of the optical fiber.

10. The holding member for the optical collimator according to claim 8, wherein a part of the abutting surface facing the optical fiber inserted via the insertion hole forms an angle of 30 to 80 degrees inclusive with respect to a plane orthogonal to an insertion direction of the optical fiber.

11. The holding member for the optical collimator according to claim 8, wherein a part of the abutting surface facing the optical fiber inserted via the insertion hole and a part of the abutting surface facing the collimator lens housed in the housing part form different angles with respect to a plane orthogonal to an insertion direction of the optical fiber.

12. The holding member for the optical collimator according to claim 8, wherein a part of the abutting surface facing the collimator lens housed in the housing part constitutes an inclined surface, and the inclined surface forms an angle of 0 to 45 degrees inclusive with respect to a plane orthogonal to an insertion direction of the optical fiber.

13. The holding member for the optical collimator according to anyone of claims 8, 9 to 12, wherein removal processing is performed on a surface of a part of the abutting surface facing the collimator lens housed in the housing part.

* * * * *